US011623876B2

(12) United States Patent
Licht (10) Patent No.: US 11,623,876 B2
(45) Date of Patent: Apr. 11, 2023

(54) PHAGR BASIN

(71) Applicant: Louis A. Licht, North Liberty, IA (US)

(72) Inventor: Louis A. Licht, North Liberty, IA (US)

( * ) Notice: Subject to any disclaimer, the term of this patent is extended or adjusted under 35 U.S.C. 154(b) by 46 days.

(21) Appl. No.: 17/249,269

(22) Filed: Feb. 25, 2021

(65) Prior Publication Data

US 2021/0179445 A1 Jun. 17, 2021

Related U.S. Application Data

(63) Continuation-in-part of application No. 16/291,321, filed on Mar. 4, 2019, now Pat. No. 10,865,129.

(60) Provisional application No. 62/981,628, filed on Feb. 26, 2020.

(51) Int. Cl.
| | | |
|---|---|---|
| *C02F 1/00* | (2006.01) | |
| *C02F 1/28* | (2006.01) | |
| *C02F 3/32* | (2006.01) | |
| *C02F 3/30* | (2006.01) | |
| *C02F 3/04* | (2006.01) | |

(Continued)

(52) U.S. Cl.
CPC .............. *C02F 1/006* (2013.01); *C02F 1/001* (2013.01); *C02F 1/281* (2013.01); *C02F 1/283* (2013.01); *C02F 3/327* (2013.01); *C02F 3/046* (2013.01); *C02F 3/302* (2013.01); *C02F 2101/16* (2013.01); *C02F 2101/322* (2013.01); *C02F 2209/40* (2013.01); *C02F 2305/06* (2013.01); *Y02W 10/10* (2015.05); *Y02W 10/37* (2015.05)

(58) Field of Classification Search
CPC .......... C02F 1/006; C02F 1/001; C02F 1/281; C02F 1/283; C02F 3/327; C02F 3/046; C02F 3/302; C02F 2101/16; C02F 2101/322; C02F 2209/40; C02F 2305/06; Y02W 10/10; Y02W 10/37
USPC .......................... 210/602, 616, 617, 903, 906
See application file for complete search history.

(56) References Cited

U.S. PATENT DOCUMENTS

| | | | | |
|---|---|---|---|---|
| 4,287,682 A | * | 9/1981 | Browne | ................. A01G 27/04 47/72 |
| 5,863,433 A | * | 1/1999 | Behrends | ................ C02F 3/327 210/150 |

(Continued)

FOREIGN PATENT DOCUMENTS

| | | | |
|---|---|---|---|
| CN | 100572303 C | * | 12/2009 |
| WO | 2010044115 A1 | | 4/2010 |

*Primary Examiner* — Fred Prince
(74) *Attorney, Agent, or Firm* — McKee, Voorhees & Sease, PLC (57) ABSTRACT

A scalable phytoremediation system that uses rock medium supporting a Salicaceae (poplar or willow) tree rhizosphere in a basin with controllable volume and water depth that results in tertiary treatment requirements for organic BOD, pathogens, ammonia-nitrogen, nitrate-nitrogen and phosphorous pollutants and PFAS. COC removal is achieved by pollutant sorption, plant uptake and increased microbial mineralization activity. Phyto basin achieves faster pollutant mineralization to achieve regulated water quality standards. The Basin reactor system uses photosynthesis and rhizosphere dynamics to create a predictable reactor into carbon-rich microbial biomass to remove waste water pollutants (COC). The Basin uses <10% of the energy required for alternative tertiary treatment system. The Basin COC treatment functions year-round including through the trees dormant season.

11 Claims, 11 Drawing Sheets

PhAGR Basin schematic profile where wastewater flows by gravity laterally from the upgradient basin end through the tree-rooted rock media to metered drain (51) Int. Cl.
 *C02F 101/16* (2006.01)
 *C02F 101/32* (2006.01)

(56) References Cited

U.S. PATENT DOCUMENTS

| | | | |
|---|---|---|---|
| 5,893,975 A * | 4/1999 | Eifert | C02F 3/327 |
| | | | 210/150 |
| 5,947,041 A | 9/1999 | Licht | |
| 6,250,237 B1 | 6/2001 | Licht | |
| 9,162,169 B1 | 10/2015 | Stivers | |
| 10,358,784 B1 * | 7/2019 | Cherrier | E02B 11/005 |
| 10,865,129 B2 | 12/2020 | Licht | |
| 2003/0036619 A1 | 2/2003 | Chrisman et al. | |
| 2005/0082222 A1 | 4/2005 | Austin | |
| 2006/0060523 A1 * | 3/2006 | Kerns | C02F 3/327 |
| | | | 210/259 |
| 2012/0091057 A1 | 4/2012 | Kent et al. | |
| 2013/0276370 A1 | 10/2013 | Licht | |

* cited by examiner

Figure 1. PhAGR Basin schematic profile where wastewater flows by gravity laterally from the upgradient basin end through the tree-rooted rock media to metered drain Figure 2: PhAGR Basin plan view shows water path flowing though the rhizosphere reactor

The PhAGR Basin under construction with forthcoming tree planting into basalt has a drain with a water depth sensor to maintains a fixed depth and volume.

FIG. 3

Salicaceae spp. (poplar and willow trees) grown in pots and ready for transplant into Basins as basalt rock media is added.

FIG. 4

Trees planted into Basin with basalt rock filled around trees and roots.

FIG. 5

Basin rock placed around stem resulting in roots growing throughout media.

FIG. 6

PhAGR Basin plants and basalt rock are installed and washed.

FIG. 7

August 2020 PhAGR Basin plants irrigated with on-site well water and mineral fertilizer started but will grow better with septic effluent

FIG. 8

August 2020 PhAGR Basin located at a research facility are growing a 2-year poplar and willow rhizosphere to aerate, adsorb, react, transpire and denitrify for a legal waste water discharge.

FIG. 9

Figure 10: PhAGR Basin profile view for low flow <1,500 gpd with irrigated trees growing roots to remove COC's from water.

Figure 11: PhAGR Basin plan view for low flow <1,500 gpd used to remove COC's from water sources including ground water and waste water.

PHAGR BASIN

CROSS-REFERENCE TO A RELATED APPLICATION

This application claims priority under 35 U.S.C. § 119 to Provisional Application U.S. Ser. No. 62/981,628, filed Feb. 26, 2020, and under 35 U.S.C. § 120 to U.S. Ser. No. 16/291,321, filed Mar. 4, 2019, now U.S. Pat. No. 10,865,129 issued on Dec. 15, 2020, all of which are herein incorporated by reference in their entirety.

FIELD OF THE INVENTION

The present invention relates to a process for the treatment of water and, more specifically, to the removal of Contaminants of Concern (COC) in water referred to here as "COC" water using a Phytoremediation reaction cell. COC among others include nitrate-nitrogen, ammonia-nitrogen, BOD organics, *E. coli* and related pathogens, phosphates, petrochemicals and chlorinated organics.

BACKGROUND OF THE INVENTIONS

This application is related to and is a continuation-in-part of Ser. No. 16/291,321, now U.S. Pat. No. 10,865,129 which describes the PhAGR® Bag reactor and is incorporated herein by reference. This application is for the PhAGR® Basin which has been developed after new insight into phytoremediation treatment for treating pollutants in water.

Over the years there has arisen concern on the part of scientists, environmentalists, and the general public as to the condition of our environment, and the adverse impact that humans have had upon it. Some of this concern has been directed toward the destruction of forests and trees which provide oxygen for our atmosphere, and toward the introduction of environmental pollutants, especially those entering surface water and ground aquifers that eventually supply drinking water. Pollutants can be from point sources, like a pipe, or they can be non-point sources such as runoff from urban streets or diffuse leakage from soil. COC in wastewater are regulated by the 1972 Federal Water Pollution Control Act Public Law 92-500 and drinking water is regulated in the 197 Safe Drinking Water Act PL 93-523. Water quality standards for ammonia-nitrogen, nitrate-nitrogen, total nitrogen, Biological Oxygen Demand (BOD) and pathogens have become stricter since original passage of these laws. Tertiary treatment to achieve modern legal discharge levels has become difficult and expensive, especially for small communities.

Two of the most commonly used methods of removing such pollutants is to treat the water in septic tanks or treatment lagoons before it is released to waters of the state as dictated by a National Pollutant Discharge Elimination System (NPDES) permit.

In accord with the present invention, the root zone rhizosphere in the containerized basin system develops a predictable COC removal capability. Natural processes are driven by photosynthesis creating carbohydrates and amino acids which travel to roots for new growth and exudation through root surfaces to adjacent growing media. Microbes adopt and thrive on these exudates as their primary carbon energy source and impact the rhizosphere physical and chemical properties. The microbes can thus remove COC as a secondary carbon and nutrient source, and the microbial reaction rates can be measured and predicted.

A clear linkage is made between the Gulf of Mexico Hypoxia dead zone and the U.S.A. Midwest nutrient leakage into the Mississippi River. Wastewater discharged to waters of the state by all U.S. communities must achieve lower ammonia-nitrogen, nitrate-nitrogen and *E. coli* pathogen concentrations. This urgent issue is a concern nationwide. Starting in 1988, research showed that poplar roots could be grown in trenches to remove >95% nitrate-nitrate in near-surface groundwater seeping into drainage ditches from upgradient cornfields. Conceptual research showing rhizosphere reactions specifically for nitrate and ammonia nitrogen removal began for this inventor when pursuing his Ph.D. in environmental engineering at The University of Iowa. This research culminated in U.S. Pat. Nos. 5,947,041 and 6,250,237 both titled "Method for Using Tree Crops as Pollutant Control", both of which are incorporated herein by reference. These patents related to pollutant control principally using Salicaceae family trees (*Populous* spp. and *Salix* spp.). The phytoremediation (hereinafter referred to as "Phyto") concept of these patents was utilized for cleaning petrochemicals, fertilizer nutrients, and soluble minerals from groundwater using fixed position plants planted into soil, which are not moveable and scalable units.

The PhAGR Bag of U.S. Pat. No. 10,865,129 and the PhAGR Basin of this application before have clear and apparent advantages over fixed position unitary (non-scalable) devices, such as lagoons and tree buffers planted in fields as described in some of my earlier patents.

Phyto-attached Growth Reactor (PhAGR®) concept has two components—the PhAGR Bag and PhAGR Basin. PhAGR Bags are irrigated with septic effluent where ammonia is oxidized to nitrate and then drains into PhAGR Basin where controlled water table creates anoxic conditions to denitrify nitrate.

Both PhAGR configurations are used in the Example 1, below. PhAGR Basin is the current application and the priority claimed provisional. In both PhAGR configurations, *Populus* spp. and *Salix* spp. trees roots expand from stems and grow roots. Microbes supported by the roots and fed primarily by root exhudates remove nitrate-nitrogen, ammonia nitrogen, BOD, and pathogens at high rates from a wastewater influent. The PhAGR Basin follow PhAGR Bag and necessary specifically for nitrate-nitrogen removal.

The media in the PhAGR Bag is perlite. The chemistry in the PhAGR Bag is aerobic with significant oxygen throughout the rhizosphere. Aerobic PhAGR Bags oxidize ammonia to nitrate nitrogen.

The PhAGR Basin of this application controls water exposure to the rhizosphere microbes where COC's are mineralized to concentrations achieving regulated discharge standards.

The water chemistry in the PhAGR Basin is primarily Anaerobic or anoxic conditions controlled by water depth and dwell time. Anoxic conditions consume rhizosphere carbon and nitrate-nitrogen.

Media in the PhAGR Basin is large grain basalt rock that has large pores between rocks, allowing rapid drainage and lateral flow without plugging.

SUMMARY OF THE INVENTION

A PhAGR Bag is aerobic where oxygen in wastewater is the primary electron acceptor. PhAGR Basin is anoxic where nitrate/nitrite nitrogen are the primary electron acceptors or anaerobic where carbon dioxide is the primary electron acceptor.

A PhAGR Bag of U.S. Pat. No. 10,865,129 was built and operated to pull air into the rhizosphere along with the wastewater to create oxygen concentrations greater than 8 ppm oxygen in the reactor. The PhAGR Bag drains by gravity out the bag bottom.

In contrast, a PhAGR Basin of FIGS. 1-11 is built and operated to eliminate oxygen in waste water by controlling the impounded water depth creating an anoxic or anaerobic rhizosphere engineered to specifically remove nitrate/nitrite nitrogen, though other COC's are also removed.

Data for the PhAGR Basin is here presented in the Examples.

DETAILED DESCRIPTION OF THE INVENTION

Photosynthesis captures atmospheric carbon dioxide and creates biomass containing biomass and emits oxygen.

$$6CO_2 + 6H_2O \xrightarrow{(sunlight)} 6CH_2O(biomass) + 6O_2.$$

In the PhAGR Bag and PhAGR Basin, a significant microbial reaction is the mineralization of organic pollutant biomass, which results in pollutant removal.

$$6\ CH_2O\ (pollutant\ biomass) + 6O_2 \xrightarrow{(aerobic\ microbes)} 6CO_2 + 6H_2O + microbial\ biomass.$$

Specifically, ammonia nitrogen in the form of ammonium $NH_4^+$ is adsorbed to rhizosphere surfaces and either taken up by plants or nitrified to nitrate nitrogen.

$$NH_4^+(pollutant\ biomass) + 2O_2 \xrightarrow{(aerobic\ microbes)} 2H^+ + NO_3^- + H_2O + microbial\ biomass.$$

Soluble oxygen in the Basin water is consumed by microbes in aerobic reactions. After the oxygen is consumed, anoxic respiration begins where nitrate-nitrogen is the electron acceptor in the basin. The denitrification reaction for organic matter and nitrate consumption follows:

$$5CH_2O(pollutant\ biomass) + 4NO_3^{2-} + 4H^+ \xrightarrow{(anoxic\ microbes)} 5CO_2 + 7H_2O + 2N_2(gas) + microbial\ biomass$$

Pollutant carbon-containing compounds in municipal sewage, industrial waste waters, storm water, or ground water are microbially degraded in nature. In PhAGR, plant derived organic matter—simply represented by $CH_2O$—is more abundant than pollutant biomass and fuel the tertiary microbial treatment reactions. The present invention fills this need as demonstrated below, and at a much lower cost.

In the controllable PhAGR rhizosphere reactor of the present invention a dense root mass grows throughout a rock-filled container. The effluent is dosed for a predictable dwell time within the basin rhizosphere as a final treatment process. The roots add carbon throughout the basin containment. Because the trees grow, they continue to add subsurface carbon at increasing rates and gain capacity with maturity.

Dwell time is accomplished by measuring the depth by a sensor which controls a drainage valve. Drainage water is monitored and discharged to a drainage field or stream through a National Pollutant Discharge Elimination System (NPDES) permitted outlet.

The invention system is superior to previous tertiary treatment technologies in effective removal and lower removal cost. Currently, typical small-town environmental-engineered technologies for cleaning wastewater include lagoons, trickle filters, sand filters, submerged attached growth reactors (SAGRs), wetlands and oxidation ditches. These technologies are inefficient, time-consuming and expensive to construct, and are therefore often unable to adequately address the waste needs of small flow generators and rural communities. This invention also has the advantage of being easier to install and operate, especially for small rural communities, where there are few construction grants, and where tax rates are a sensitive issue for future economic development and new jobs.

Water quality achieves a quality standard sufficient for crop and landscape irrigation. It demonstrates that many COC's will be absorbed and mineralized by root-fed microbes and will increase system capacity as roots expand and mature throughout growing media. The unit drainage will be routinely measured and tracked for water quality parameters established in regulated discharge standards. System operation reports are compiled and submitted to regulators as required in permits for oversight. The unit size can range from a single reactor (cell) for treating small, isolated water flows to a large array of cells capable of treating waste water from a small community, or selected manufacturing facilities, storm water runoff drainages, hospitals, veterinary clinics and landfills.

An advantage of the present invention is space efficiency—it can be a single basin or multiple basins operated in either parallel or sequential. Because photosynthesis provides the primary carbon source and the flow is by gravity, the phyto basin has lower energy and labor operating costs compared to systems using inert plastic, mineral rock or membrane media. The units can fit within future practices supported by U.S. EPA and U.S. Department of Agriculture programs for nutrient management in small streams often flowing through rural communities.

Treatment capacity of the system begins immediately with root sprouting and increases as plant roots grow, which is an improvement on other mechanical treatment techniques that decrease in capacity as they wear with time. The system also has a high microbe concentration growing as an attached growth connected to dense roots that adsorb and mineralize organic compounds including pathogens, pharmaceuticals, hormones, and sewage solids. The system also removes nitrate-N to achieve discharge standard in both the growing season with active photosynthesis and in the tree dormant season where the principal carbon source is stored biomass deposited during the growing season in the cell media. The system is operated with sufficient COC removal capacity even in the dormant season when other treatment options including saturated sand filters, lagoons, wetlands and oxidation ditches are ineffective due to cold weather slowing deamination and denitrification reactions. The system uses porous rock media that resists root plugging.

Salicaceae family trees can be coppiced for controlled above surface plant height but continued rhizosphere reactions. Media selection with high porosity is essential for water percolation to allow fast filling and rapid drainage. Basalt rock is used in the first operating phyto basin. Poplar and willow both expand roots through full media volume when planted by a stem pushed through the full media depth.

One advantage of the invention is to greatly reduce fossil energy requirements, compared to current treatments such as aeration that is normally the largest power requirement for public works in rural communities. Dosing water, holding the water in the rhizosphere, then draining the water by gravity following sufficient microbial contact uses less than 10% energy compared to recirculating and aerobic systems. Different pollutant removal reactions dominate aerobic vs. anaerobic/anoxic conditions. Oscillating the redox potential and increasing the root and microbial carbon in the PhAGR increases unit's treatment applicability to organic petrochemicals, chlorinated solvents, pharmaceuticals, hormones, pathogens, and perfluoroalkyl substances (PFAS) specifically including perfluorooctanoic acid and perfluorooctane sulfonate-more commonly referred to as PFOA and PFOS.

A further objective of the present invention is to provide a remote instrumented sensing, monitoring, and mechanical control technique that allows off-site or on-site dose and dwell time control. Because many of these targeted small treatment systems are located where on-site operators are both busy and insufficiently trained and licensed for advanced COC treatment, the system can include external communication to off-sight technical support staff to control and monitor performance.

Routine maintenance by trained field staff will maintain sufficient COC removal and can be scheduled based on operating data.

Another advantage of the present invention is to provide a system that fits technically with skills found in small community or industrial organization. The cells are a basic irrigated plant system operable by local staff found in rural or urban settings who can provide routine observation and operation changes. The core reactions are based on an elegant application of agronomic and environmental phenomena that occur in nature. Plants, soils, and agronomic concepts are familiar to farmers and gardeners in small communities contributing to ease of routine maintenance and operating success.

Woody biomass can be removed from the treatment system along with nutrient elements taken up by trees by simple, regular harvest. The biomass can be used for fuel, fiber, compost and bedding.

At the end of the unit's life, the media and roots can be recycled. Biomass is composted. PhAGR media including perlite and rock can be reused. Thus, the advantages are apparent.

The system is instrumented to monitor flow, nitrate-nitrogen, ammonia-nitrogen, pH, oxidation-reduction potential (ORP), and temperature. All monitoring data will be transmitted to maintain and operate cells. Other instrumentation can be added as needed or required.

COC's classified as organic hydrocarbons such as pharmaceuticals, growth hormones, steroids, oils, military explosives, and fuels will be adsorbed on organic root surface. Pathogens are sorbed and degraded by competing rhizosphere microbes densely growing on the root surface. Petrochemical and naturally derived organics are removed by adsorption with ongoing secondary metabolism by microbes feeding primarily on root exudates. These compounds include pharmaceuticals, hormones, steroids, proteins, carbohydrates, fuels, solvents, various pesticides, and manufactured organic intermediates.

The tree's pollutant treatment performance can be enhanced by nutrient additives and microbe inoculums. When designed for subfreezing winter effluent treatment, PhAGR can be configured within a greenhouse or other protective structure to shelter from freezing conditions.

Annual tree maintenance cycle includes routine tree harvest with coppiced regrowth. There will be routine replacement of the treatment cell as needed; age will depend on prefiltration effectiveness, water chemistry, location and sustained efficacy. When the operating life of a PhAGR bag is completed, the treatment cell media along with roots and sorbed compounds can be composted.

When PhAGRs operate, monitored data feeds a treatment algorithm will track performance, thus allowing the operator to control effluent flow. Data is tabulated and prepared for regulatory reporting.

Example 1

PhAGR Basin construction started in late 2019 and was planted in 2020 at a Recreational Vehicle (RV) Park site permitted by the Oregon Dept. of Environmental Quality in the state of Oregon. Fifty RV parking spots connected to a septic wastewater treatment system is designed for 5,000 gallons per day. The septic tank effluent water does not achieve current discharge standards.

PhAGR Basin at this RV park is depicted in FIGS. 1-9; Table 1 lists the identification numbers used in the graphics.

TABLE 1

Graphic identification numbers used in FIGS. 1, 2, 10, and 11.

| Graphic identification # | PhAGR Components |
|---|---|
| 11 | Water input to PhAGR Basin draining from PhAGR Bags |
| 12 | Water table phreatic surface elevation maintained |
| 13 | Horizontal flow to the drainage |
| 14 | Salicaceae trees (*Populus* spp and *Salix* spp.) |
| 15 | Basalt gravel fill into basin (average depth 32-inches) |
| 16 | Subsurface curtains to direst flow and prevent short circuiting |
| 17 | 4" ADS drainpipes to remove water from basin to discharge |
| 18 | Recirculating Sump pump to discharge water from the Basin |
| 19 | Manual shut off valve and sensor to control Basin water flow and depth |
| 20 | Drain vault is 30" diameter ADS pipe where drainage pipes meet sump pump |

TABLE 1-continued

Graphic identification numbers used in FIGS. 1, 2, 10, and 11.

| Graphic identification # | PhAGR Components |
|---|---|
| 21 | Discharge to PhAGR Bags or Head End of the basin for recirculation |
| 22 | Salicaceae trees (*Populus* spp and *Salix* spp.) |
| 23 | Roots expanded throughout the basin |
| 24 | Rapidly drainable porous media (Perlite) |
| 25 | Saturated Anoxic or Anaerobic Rhizosphere |
| 26 | Containment Basin |
| 27 | Drain line |
| 28 | Waste water drip or spray irrigation |
| 29 | Water depth level controlled in Basin |
| 30 | Stand pipe with control valve |

Figure 1:
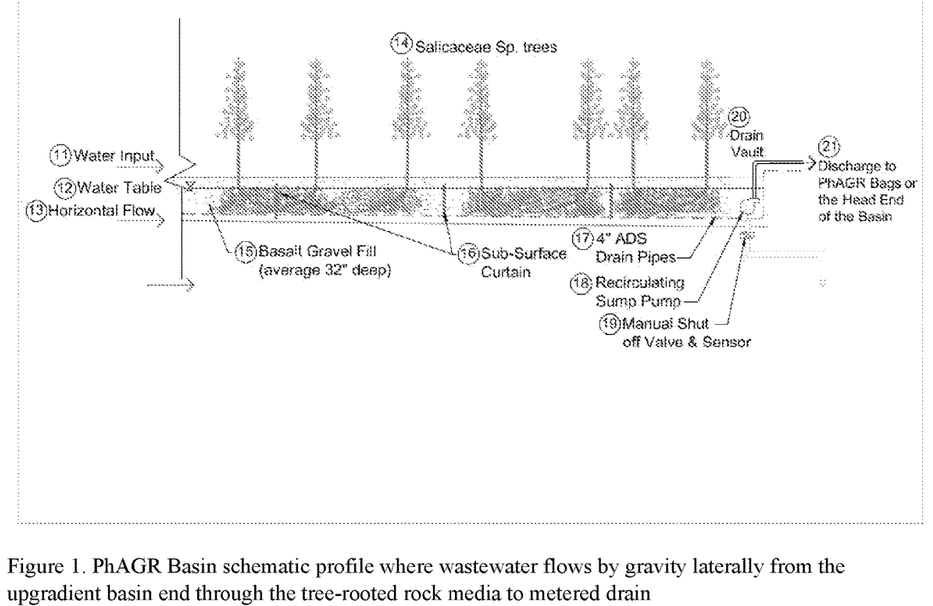
FIG. 1. PhAGR Basin schematic profile where wastewater flows by gravity laterally from the upgradient basin end through the tree-rooted rock media to metered drain
Figure 2:
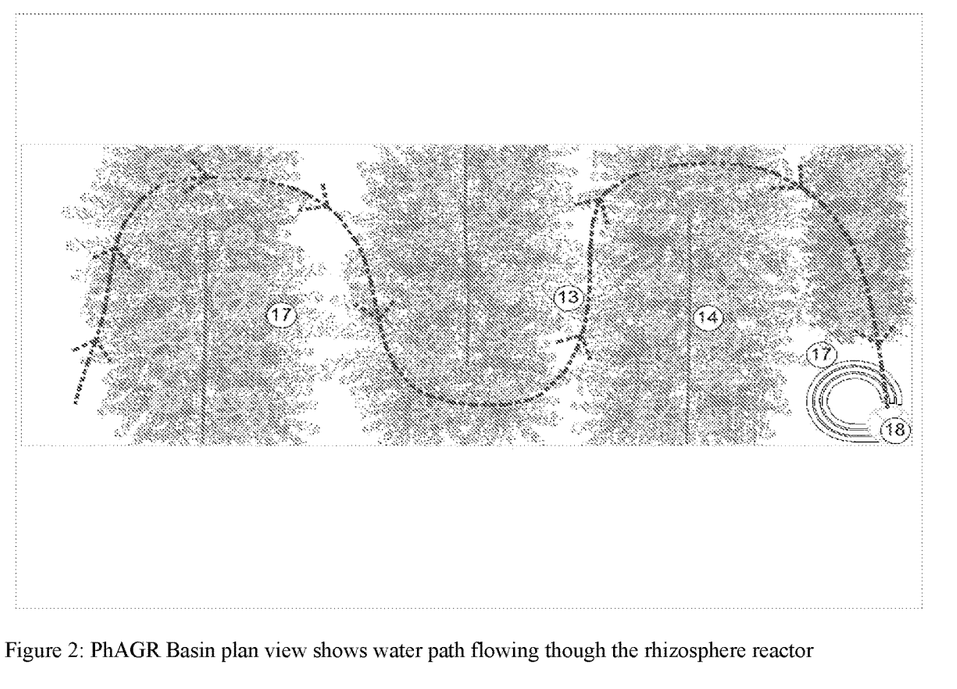
FIG. 2: PhAGR Basin plan view shows water path flowing though the rhizosphere reactor
Figure 3:
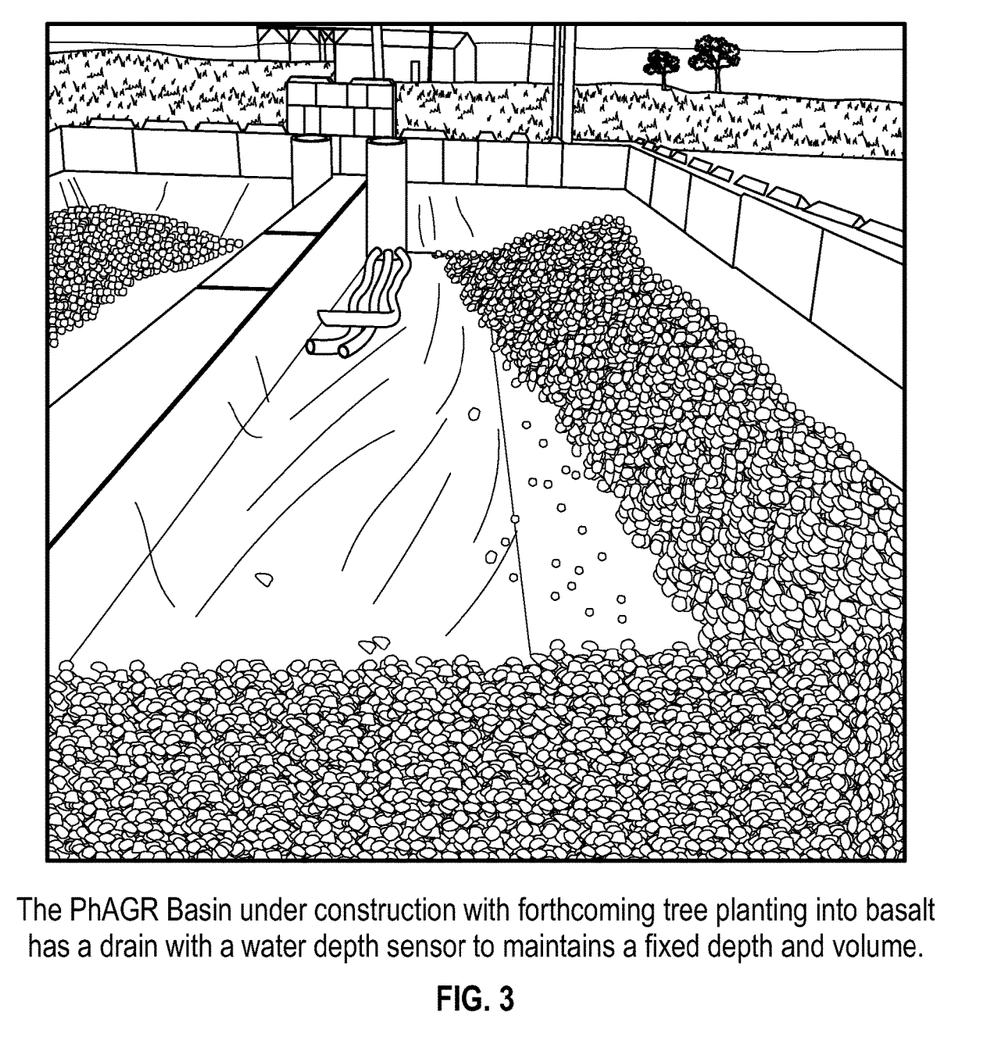
FIG. 3: The PhAGR Basin still under construction has a drain with a water depth sensor to control a valve that maintains a fixed depth and volume.
Figure 4:
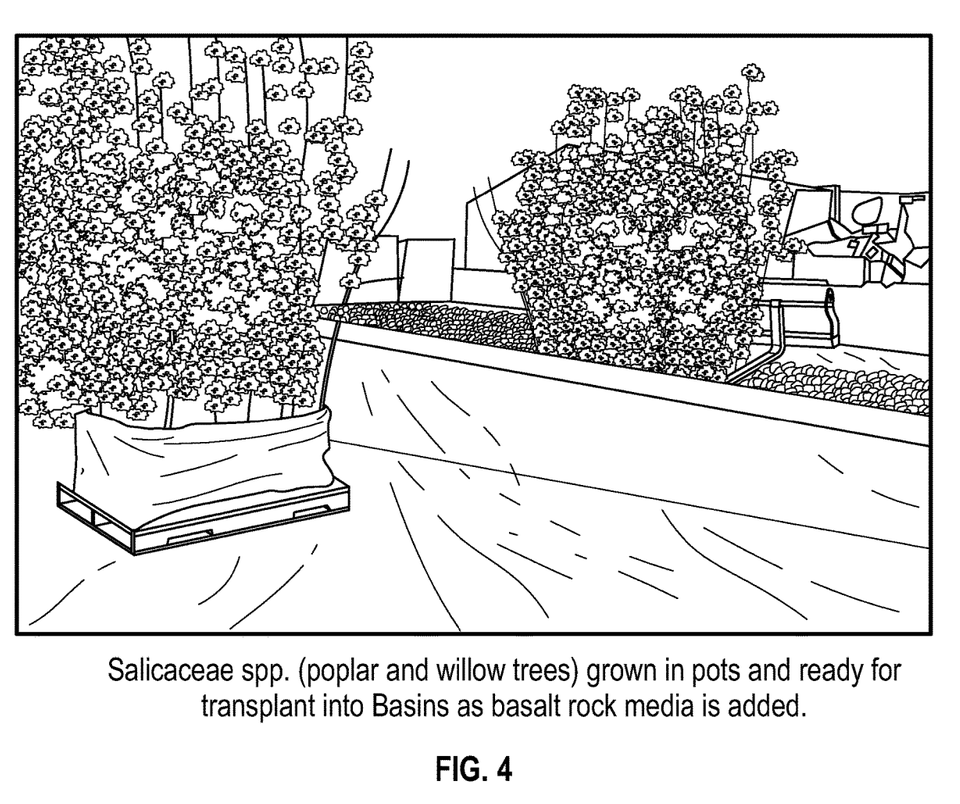
FIG. 4: Salicaceae spp. (poplar and willow trees) grown in pots and ready for transplant into Basins as basalt rock media is added.
Figure 5:
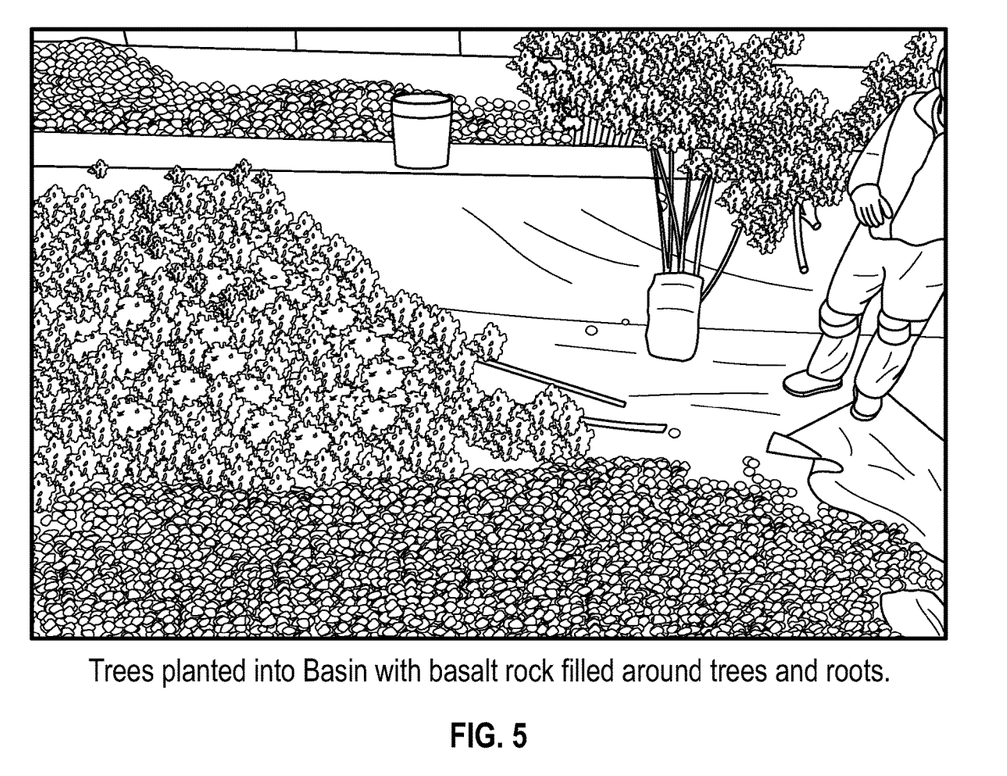
FIG. 5: Poplar and willow trees started previous growing season are planted into Basin basalt rock supporting roots expansion.
Figure 6:
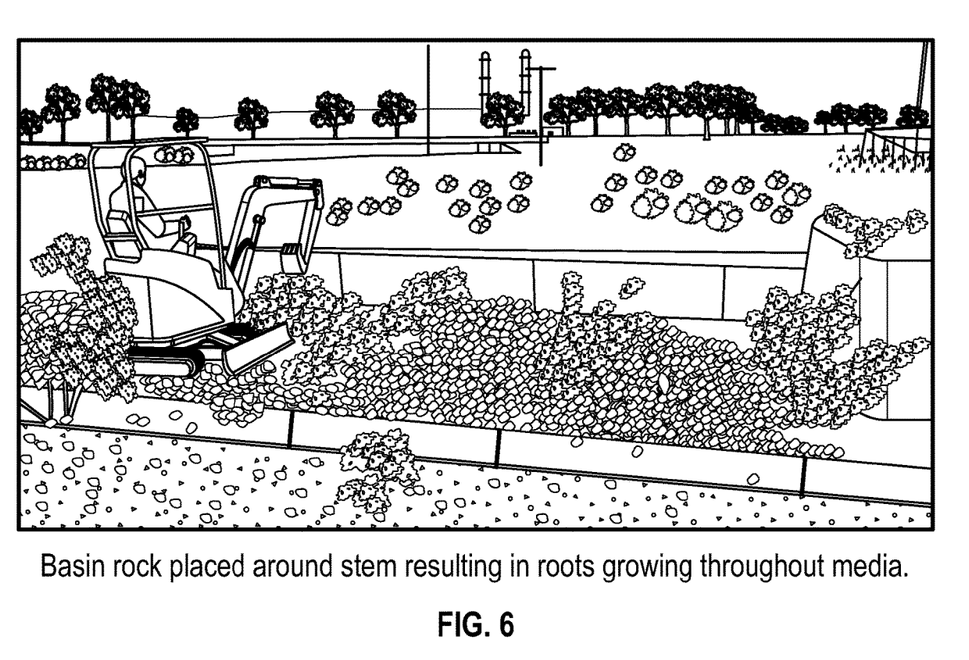
FIG. 6: Basin rock placed around stems result in roots growing the entire planted depth penetrating throughout basalt media.
Figure 7:
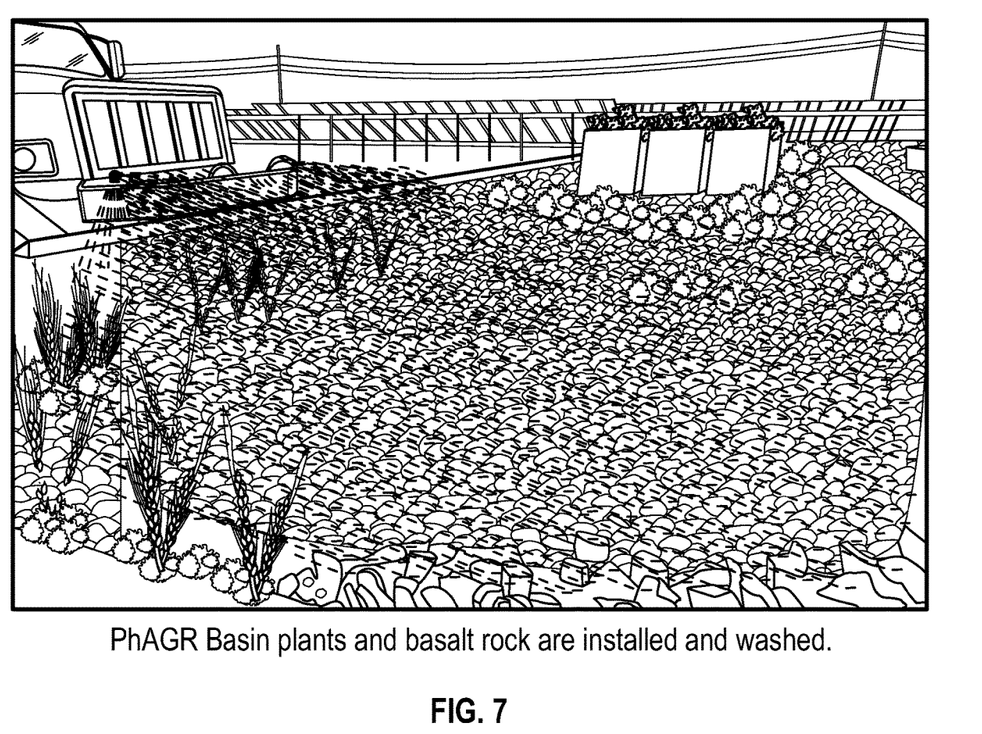
FIG. 7: PhAGR Basin plants and basalt rock are installed, and media washed with on-site well water.

In FIG. 1 is PhAGR Basin schematic profile. Water input is post-PhAGR Bag wastewater (11) that horizontally flows (13) downgradient and through the media (15). Basin water depth (12) is maintaining at a desired depth using valves and pumps (19) in drain vault. (20). The poplar and willow trees (14) grow in porous basalt gravel (15). FIG. 2 shows a plan view of the water flow through the basin reactor where subsurface curtains (16) create greater root contact. FIG. 3 shows the Basin under construction with containment layer prepared for tree and basalt placement.

FIG. 4-7 show poplar and willow trees (14) grown in Basin with basalt rock (15) for filling in around trees.

Figure 8:
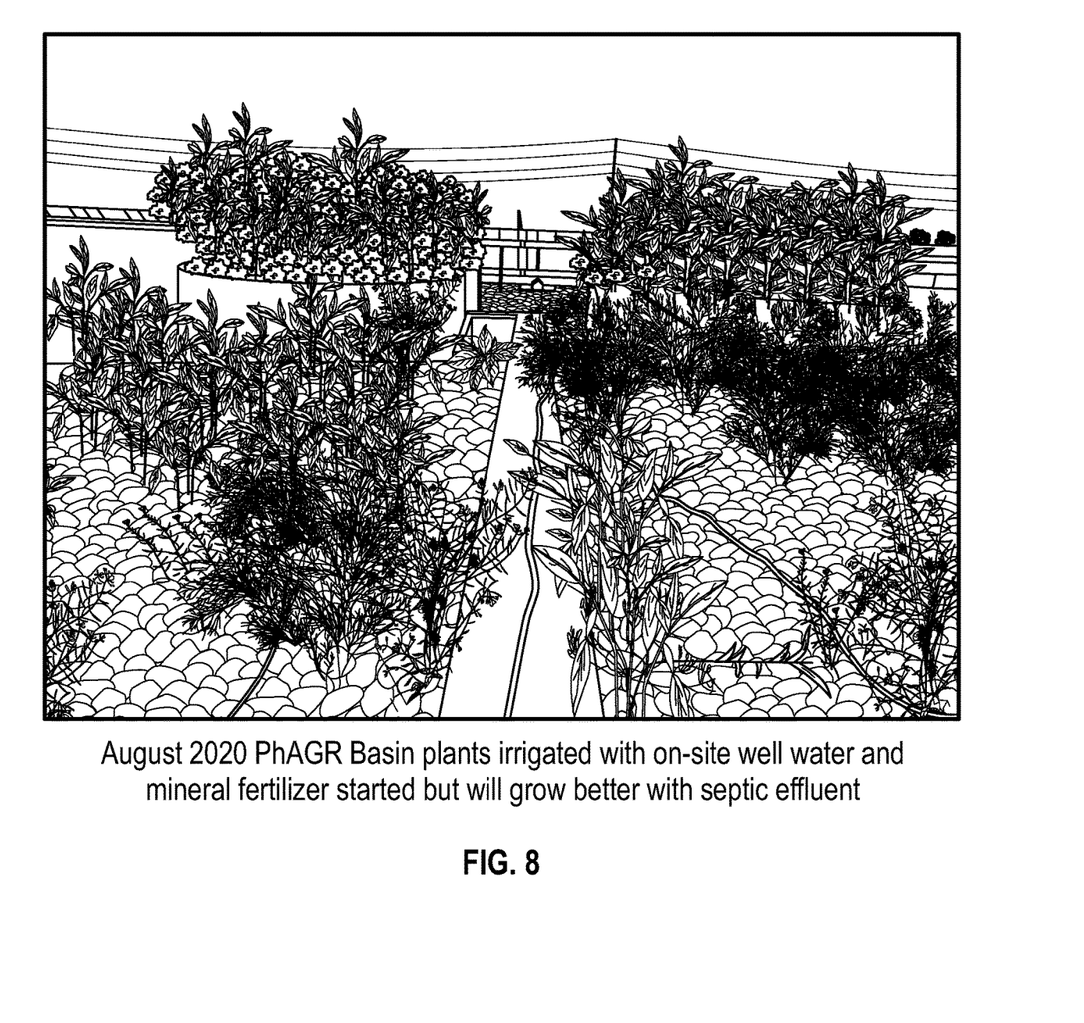
FIG. 8: August 2020 5 months post installation PhAGR Basin plants irrigated with on-site well water and mineral fertilizer started but will grow better with septic effluent.

FIG. 8 shows the Basin with poplar and willow growing well with root expansion into the basalt rock voids estimated to be 30+% of the total Basin volume. Media in the PhAGR Basin at the RV park is large grain basalt rock that has large pores between rocks, allowing rapid drainage and lateral flow without plugging. Anaerobic or anoxic chemistry conditions are controlled by water depth in the Basin (FIG. 1).

The water enters the Basin upgradient of Salicaceae trees (poplar and willow) and flows horizontally through interconnected large pores between the rock. Trees grow roots hydroponically into the rock pores creating a microbial population on the root surface. The drainage from the basin is a sump located at the downgrade corner. The sump contains a drain on the downgradient end of the basin. The depth sensor controls the drain valve to maintain a controlled water depth resulting in sufficient water dwell time to create anoxic conditions that denitrify nitrate nitrogen to dinitrogen gas. As water is exposed to the roots and microbes, COC's are mineralized to concentrations achieving regulated discharge standards.

COC contact with roots is improved by making a serpentine flow through the rhizosphere as water migrates to the drain.

This full-scale unit will test variables such as flow rates, dwell time, tree varieties, oxidation-reduction potential, pH and temperature.

The water flows in a serpentine pattern to provide more root contact and avoid a short flow circuit that limits reactor contact time.

The rhizosphere grows throughout media to provide predictable COC removal capacity, scaled for full-scale system. FIG. 3 shows the empty volume that is filled with a 32" deep basalt rock layer with >30% porosity.

This Basin is designed for a daily dose 5,000 gallons per day pretreated by a septic tank and PhAGR Bags.

Schematic profile (FIG. 1) shows the PhAGR Basin. Waste water following septic treatment but still containing COC's above regulated standards is pumped through a disk filter then irrigated on top of the PhAGR Bags.

Water passes through the PhAGR Bag rhizosphere which aerates the anaerobic septic waste water removing ammonia- and BOD. The Bag drains through the Bag bottom into the basalt rock layer. In PhAGR Basin, waste water enters upgradient of Salicaceae trees (*Populous* spp. poplar and *Salix* spp. willow) and flows laterally by gravity through interconnected large pores between the rock to the sump. Component parts to the PhAGR Basin (FIG. 1) integrate COC exposure to a rhizosphere where microbes thrive with root carbon as the primary food source. The COC is a secondary energy source for these microbes attached to the root.

PhAGR Basin drainage is controlled to ensure that the desired water depth and dwell time is met. The PhAGR Basin water depth is controlled to favor anoxic or anaerobic conditions. Willow and poplar roots can grow hydroponically with no soil in the drainage rock. Carbon exuding from roots feed microbes creating anoxic conditions to denitrify nitrate-nitrogen and continue treating COC's. COC still entrained in the PhAGR Bag drainage are a secondary food source for the microbes; the primary food source is root exuded sugars and proteins. The COC's are mineralized to legal discharge standards. PhAGR Basin drains via gravity to a clean water holding tank where the discharge meets permitted concentrations before irrigated onto landscape trees.

In one constructed example, the PhAGR system received septic effluent starting in the December 2020. PhAGR Basin performance was documented after septic tank effluent was irrigated into and drained through PhAGR Bags into the PhAGR Basin. PhAGR input and output samples were measured by an instrument named Aqua TROLL 500 by In-Situ. The Aqua Troll instrument was calibrated to measure pH, oxygen reduction potential (ORP), temperature, ammonia-nitrogen, and nitrate-nitrogen.

A sample set taken Jan. 30, 2021 was analyzed by EPA-approved Kuo Laboratory, Umatilla Oreg.

A total of 39,500 gallons septic effluent was fed through the PhAGR System over a 38-day period before sampling. This is an average flow 12 gallons per PhAGR bag each day and 574 gallons draining each day into the PhAGR Basin. Before starting with effluent, the PhAGR system was drained with no free-flowing water remaining. On Dec. 24, 2020 approximately 8,000 gallons was dosed through the PhAGR bags drained into the PhAGR Basin Summary data are shown in Table 2.

TABLE 2

Input and output water analyses show ammonia and total nitrogen removal

| | | |
|---|---|---|
| Panelview RV park opening date: Nov. 20, 2019 | | |
| PhAGR irrigation start date: Dec. 22, 2020 | | |
| PhAGR operating days before water sampling: Jan. 30, 2020 | Days | 38 |
| Gallons Post-Septic Effluent to PhAGR | Gallons | 39,500 |
| Gallons Post-PhAGR to landscape | Gallons | 21,800 |
| Gallons retained in PhAGR Basin primarily | Gallons | 17,700 |
| Gallons per sq.ft. PhAGR surface | Gal/sq.ft. | 37.1 |
| Dose rate - flow | Gallons/sq.ft/day | 0.98 |
| Dose rate - dayly layer thickness - inches of water | inches water/day | 1.6 |
| Dose rate - flow/PhAGR bag per day | Gallons/bag/day | 11.95 |
| PhAGR Input measured Jan. 28, 2021 | pH | 7.54 |
| | Temperature (F. °) | 69.2 |

TABLE 2-continued

Input and output water analyses show ammonia and
total nitrogen removal

| | | |
|---|---|---|
| | ORP mv/ | −400 |
| | ppm BOD5 | 281 |
| | ppm CBOD | 226 |
| | Total N | 17.6 |
| | ppm NH3—N | 17.5 |
| | ppm NO3—N | 0.1 |
| PhAGR Output measured Jan. 29, 2021 | pH | 7.76 |
| | Temperature (F. °) | 69 |
| | ORP | 30 |
| | ppm BOD5 | 8.4 |
| | ppm CBOD | 6.11 |
| | Total N | 13.1 |
| | ppm NH3—N | 3.5 |
| | ppm NO3—N | 9.6 |

Conclusions following PhAGR startup comparing inlet and outlet water test data:
(a) The ORP went from −400 mv to +28 mv. Indicating the PhAGR bag is an aerator and oxygen which is the principal electron acceptor was increased.
(b) The pH went from 7.54 to 7.76. The denitrification reaction consumes acid thus becoming more alkaline which means the pH increases. The pH does increase.
(c) There is 24 Fahrenheit difference between outdoor temp and drainage water temperature. With a warmer PhAGR reactor, the ammonia-nitrification reaction is happening faster compared to an open unheated lagoon in equilibrium with the atmosphere.
(d) Nitrogen fate: The Total Nitrogen decreased from 17.6 ppm to 13.1 ppm which is a legal discharge. This drainage will be irrigated in landscape trees. Ammonia nitrogen decreased from 17.5 ppm to 3.4 ppm.
(e) Nitrate-nitrogen increased from 0.1 ppm to 9.6 ppm meaning ammonia nitrogen was nitrified in winter to nitrate nitrogen.
(f) Ammonia-N—which is the most regulated form of nitrogen in most urban discharges—decreased by 80% to 3.5 ppm. This is a legal discharge in most states and was accomplished in the winter with dormant young roots.
(g) The organic matter measured by BOD5 and CBOD decreased by >97% and is a legal discharge after the PhAGR Despite dormant trees the PhAGR has produced sufficient available sugars in the rhizosphere to support microbial reactions in the winter. The aerobic and anaerobic nitrogen mineralization chemistry is working. Ammonia-nitrogen and nitrate-nitrogen are removed by biomass uptake into plant material then harvested and removed. Nitrate-nitrogen is denitrified to nitrogen gas when anoxic conditions are created in the saturated PhAGR Basin rhizosphere.

Following startup with 39,000 gallons of septic effluent dosed into the PhAGR Basin, sampling and analyses of the finished water documents a waste water achieving the legal discharge criteria.

Regarding resilience—the system will increase in capacity with time. The nitrogen is expected to be removed at a greater rate during the summer months when trees take up significant nutrients and water. Leaf photosynthesis fixes carbon and produces sugars and proteins which shuttle down phloem by the roots where they are exuded to feed more carbon to microbes.

Example 2

Figure 9:
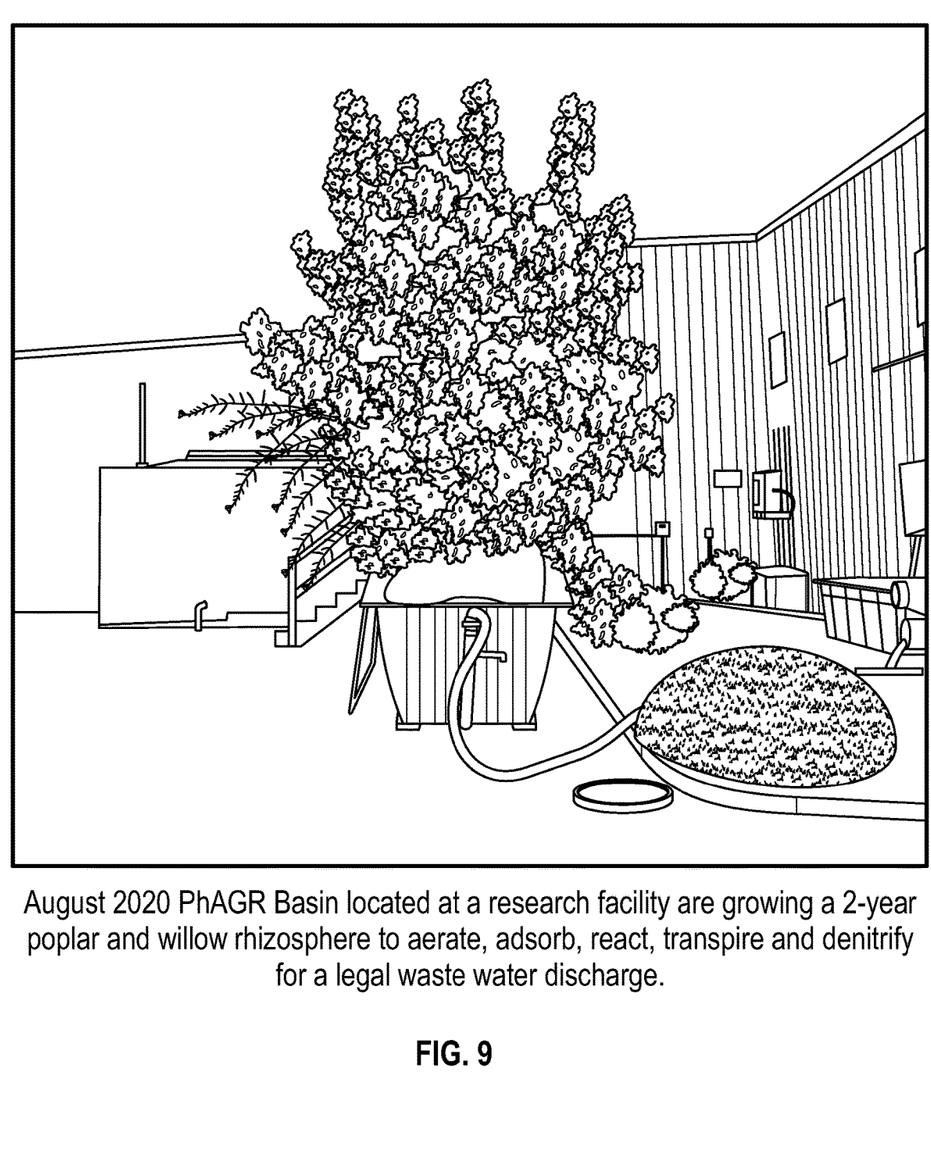
FIG. 9: August 2020 PhAGR Basin trees growing 7 months in small unit <1,500 gallons per day of post-septic tank effluent.
Figure 10:
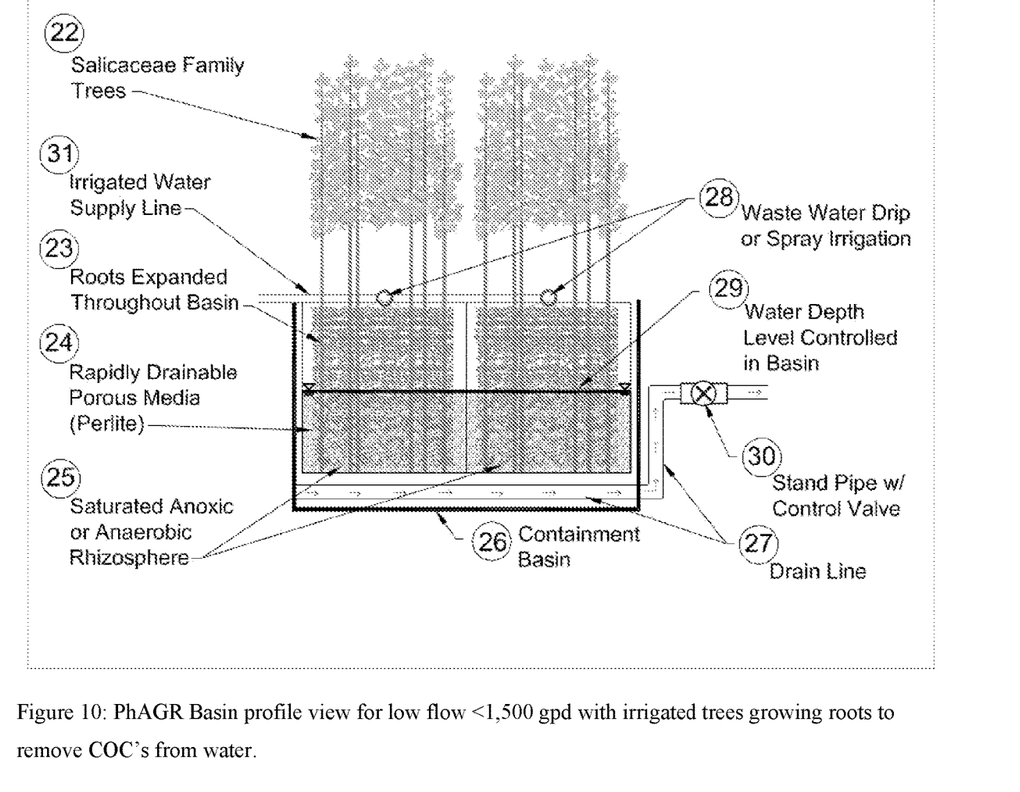
FIG. 10. PhAGR Basin plan profile view for low flow <1,500 gpd.
Figure 11:
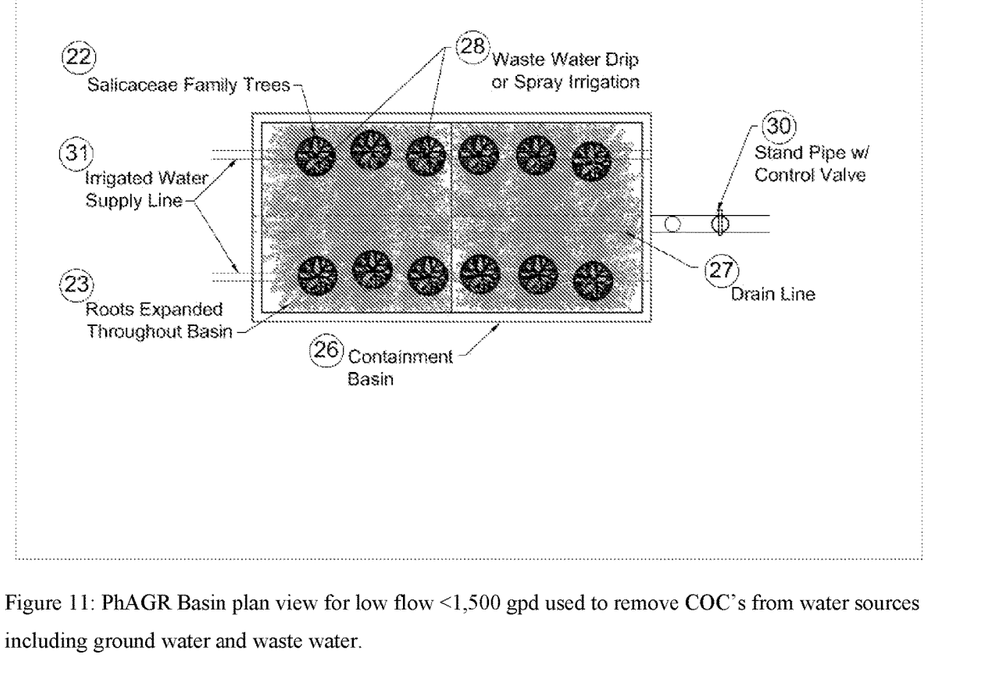
FIG. 11: PhAGR Basin plan view shows tree position and location of stand pipe.

Smaller waste water flows are common in the rural and clustered housing across the United States. This example illustrates a prototype unit to take up to 1,500 gallons per day septic tank effluent as the small PhAGR Basin feed water. Septic tank effluent water does not achieve discharge standards allowed in a typical 2020 Oregon Dept. of Environmental Quality permit. FIG. 9 shows a containment box (26), drain line (27), irrigation input (28), and water depth (29) controlled by stand pipe with control valve (30). FIG. 10 is a schematic perspective view with face wall broken away to expose the root zone (23) growing in porous and readily drainable Perlite media. FIG. 11 shows a plan view of a PhAGR Basin where irrigation (28) using either spray or drip nozzles applies water at a known dose.

TABLE 3

Graphic identification numbers used in FIGS. 10, and 11.

| Graphic identification # | PhAGR Components |
|---|---|
| 22 | Salicaceae trees (*Populus* spp and *Salix* spp.) |
| 23 | Roots expanded throughout the basin |
| 24 | Rapidly drainable porous media (Perlite) |
| 25 | Saturated Anoxic or Anaerobic Rhizosphere |
| 26 | Containment Basin |
| 27 | Drain line |
| 28 | Waste water drip or spray irrigation |
| 29 | Water depth level controlled in Basin |
| 30 | Stand pipe with control valve |

For tertiary treatment trial, this facility has two PhAGR Bag planted in a containment (26). This prototype is designed for less than 1,500 gallons per day dosed into the PhAGR Basin media (FIG. 8). The PhAGR Basin containment for the demonstration is approximately 5 feet wide, 4 feet tall and 9 feet long made from a water-impermeable material. Two PhAGR Bags are nested into this Basin. The wastewater is drip irrigated into the Basin rhizosphere. In this demonstration the inorganic media is perlite and Salicaceae trees are planted throughout the rhizosphere. Steady-state operation will be established with instruments to measure of flow rates, dwell time, COC removal efficiency and dose timing. The depth of water can be controlled in the PhAGR Basin which controls the wastewater dwell time.

The media in the PhAGR Bag is perlite. The chemistry in the PhAGR Bag is aerobic with significant oxygen throughout the rhizosphere. Aerobic PhAGR Bags oxidizes ammonia to nitrate-nitrogen.

Microbes supported by the roots and fed primarily by root exudates remove nitrate-nitrogen, ammonia nitrogen, BOD, and pathogens at high rates from a wastewater influent. The PhAGR Basin can be managed specifically for nitrate-nitrogen removal.

Microbes supported by the roots and fed primarily by root exudates mineralize nitrate-nitrogen and ammonia nitrogen along with organic matter measured as BOD. Ongoing research measures the anoxic reaction rates sufficient to remove COC from a wastewater influent at commercially viable rates. The water chemistry in the PhAGR Basin is controlled to have little oxygen, so the electron acceptor is anoxic or anaerobic. The PhAGR Basin water depth is controlled specifically to create anaerobic conditions.

Media in the PhAGR Basin is commercially available large grade perlite that is >80% pore volume allowing a controlled water depth and rapid drainage without plugging.

The PhAGR Basin depth is controlled by a drain valve (30) to maintain a controlled water depth creating sufficient water dwell time to create anoxic conditions that denitrify nitrate to nitrogen gas. As water is exposed to the roots and microbes, COC's are mineralized to concentrations achieving regulated discharge standards.

The rhizosphere is grown from Salicaceae (poplar and willow) roots. Wastewater added by drip irrigated flows through saturated media by gravity to a controlled drain on the downgradient end of the Basin. Trees grow roots hydroponically into the media pores creating a microbial population on the root surface. The drainage from the Basin is a sump located at the downgrade corner.

Treatment summary in Table 4 shows all contaminants of concern were removed to some level and the dissolved oxygen concentration increased. Because ammonia and organics degrade using oxygen and yet the oxygen increases, an increase in oxygen is consistent through 310 days of operation. The septic effluent was strong and the flow was less than 2 days of dwell time in the perlite. These data show how dose control will improved CBOD capture, ammonia-nitrogen capture, and nitrate-nitrogen removal by plant uptake or denitrification can occur.

TABLE 4

Small PhAGR Basin <1,500 gallons per day performs COC removal

| Analyte | Units | AX20RT Septic Tank Effluent | PhAGR Basin Drainage | Average % Removal |
|---------|-------|-----------------------------|----------------------|-------------------|
| CBOD5   | mg/L  | 15.2 | 4.0  | 74%  |
| TSS     | mg/L  | 4.9  | 2.7  | 46%  |
| COD     | mg/L  | 99.2 | 67.0 | 32%  |
| TKN     | mg/L  | 47.2 | 17.5 | 63%  |
| NH3—N   | mg/L  | 40.4 | 14.2 | 65%  |
| NO3—N   | mg/L  | 39.4 | 31.4 | 20%  |
| DO      | mg/L  | 4.0  | 5.2  | -31% |

Note:
310 days operation at 500 gallons per day per PhAGR Basin

Note:
Dissolved oxygen increases through ammonia, CBOD5 and COD is removed.

What is claimed is:

1. A scalable phytoremediation basin (PhAGR Basin), comprising:
    a basin container having an open top and a bottom with a controlled drain outlet;
    a liner of non-biodegradable material lining the basin container for containing a volume of COC water to be treated;
    said lined basin container being filled with a mixture of porous media adapted for supporting root expansion of cuttings of the Salicaceae family inserted into the mixture of porous media filling said basin container from the open top to the basin container bottom;
    said cuttings having stems extending up from roots growing from the cuttings and protruding from the top of said basin container growing foliage during a growing season.

2. The basin of claim 1 wherein the container is lined with a material selected from the group consisting of clay, polyethylene, and polypropylene.

3. The basin of claim 1 which contains sufficient void space volume to achieve a desired dwell time capacity.

4. The basin of claim 1 contains sufficient void space to drain at rates to achieve a desired dwell time.

5. The basin of claim 1 which includes within the media nutrients and microbe inoculum.

6. The basin of claim 1 wherein the media can include perlite and/or basalt rock blended with other material selected from the group consisting of soil, gravel, compost, biochar, activated charcoal and zero valent iron.

7. The basin of claim 1 which includes a depth sensor connected to a computer to control inlet flow rate and dwell time.

8. A method of COC water cleanup comprising;
    collecting water containing COC;
    passing said collected COC water through a phytoremediation Basin filled with media that has a sufficient porosity to allow at least 30% void volume drainage of the water;
    said Basin containing distributed roots grown from cuttings of the Salicaceae family having stems and roots extending throughout the basin; and
    collecting the drainage water with reduced COC, said drainage water when collected meeting regulated standards for pollutant reduction.

9. The method of claim 8 wherein the media is in part basalt rock.

10. The method of claim 8 wherein the media is in part perlite.

11. The method of claim 8 which includes within the media root nutrients and microbe inoculum.

* * * * *